United States Patent [19]

Gartner

[11] 4,006,319
[45] Feb. 1, 1977

[54] FOREIGN POTENTIAL CHECKER
[75] Inventor: Todd H. Gartner, Elmhurst, Ill.
[73] Assignee: GTE Automatic Electric Laboratories Incorporated, Northlake, Ill.
[22] Filed: Jan. 22, 1976
[21] Appl. No.: 651,310
[52] U.S. Cl. .......................... 179/175.3 R; 324/62
[51] Int. Cl.² ........................................ H04B 3/46
[58] Field of Search .................. 179/175.3 R, 175; 324/62, 111

[56] References Cited
UNITED STATES PATENTS

| | | | |
|---|---|---|---|
| 3,711,661 | 1/1973 | Garrett et al. | 179/175.1 R |
| 3,731,189 | 5/1973 | Sharaf et al. | 324/62 |
| 3,821,641 | 6/1974 | Portoulas | 324/62 |

Primary Examiner—Douglas W. Olms

[57] ABSTRACT

The disclosure relates to a monitoring system and method for determining the magnitude of the equivalent voltage source impedance and the magnitude of the equivalent voltage source voltage on a telephone line and switching network of a telephone system. The monitoring system measures the Thevenin source voltage and source impedance to ground on the line by applying two independent voltage conditions to the line and senses the resulting steady state voltages thereby produced in a sensing resistor. The magnitudes of the sensed steady state voltage are thereafter utilized for obtaining the Thevenin source voltage and source impedance magnitudes.

16 Claims, 5 Drawing Figures

FOREIGN POTENTIAL CHECKER

BACKGROUND OF THE INVENTION

The present invention is directed to a monitoring system for determining the magnitudes of the equivalent voltage source impedance and the equivalent voltage source voltage on a telephone line and in particular to a monitoring system for determining and indicating the magnitudes of the equivalent voltage source impedance and the equivalent voltage source voltage in a telephone system of the type having telephone lines and a switching network, wherein operating voltage sources are maintained on the line to support telephone communication and wherein each line and the network combine to form an equivalent voltage source and an equivalent voltage source impedance.

In telephone systems harmful conditions may exist on the telephone lines which could interfere with or interrupt telephone communication. Such conditions may exist on the telephone lines themselves or within the switching network to which the telephone lines are coupled. Such harmful conditions could be foreign potentials due to non-current limited DC potentials or high AC potentials which are greater than or equal to 120 volts AC from the 60 hertz commercial power network. Irregular conditions which also could interfere with telephone communication can be the presence of relatively low resistance leakage paths to ground, or low resistance paths to ground due to relays within the switching network that have not disconnected at the proper time.

It is therefore advantageous to detect such harmful conditions to eliminate the problems which they cause before telephone service is interrupted. The present invention provides a means by which such harmful conditions may be detected by realizing that each telephone line and the network combine to form a Thevenin equivalent voltage source and equivalent voltage source impedance. By measuring the magnitudes of the equivalent voltage source voltage and the equivalent voltage source impedance, such harmful conditions may be detected. It would also be advantageous to perform such a measurement and to convert the result of the measurement to a digital format which is compatable with the network controllers utilized in such telephone systems.

It is therefore a general object of the present invention to provide a monitoring system for measuring and indicating the magnitudes of the equivalent source voltage and equivalent voltage source impedance on a telephone line to detect harmful conditions which may interrupt telephone service.

It is a more particular object of the present invention to provide a monitoring system which measures the magnitudes of the equivalent voltage source voltage and equivalent voltage source impedance on a telephone line and which assigns the measured magnitudes to a range within a number of predetermined ranges to thus form a comparison to determine if harmful conditions exist on the telephone lines.

It is a still further object of the preent invention to provide a method for measuring the equivalent voltage source voltage magnitude and equivalent voltage source impedance magnitude to determine if harmful conditions exist on the telephone lines which may cause interruption of telephone service.

SUMMARY OF THE INVENTION

The present invention provides, in a telephone system of the type having telephone lines and a switching network, wherein operating voltage sources are maintained on the lines to support telephone communication and wherein each line and the network combine to form an equivalent voltage source and an equivalent voltage source impedance, a monitoring system for indicating the magnitudes of the equivalent voltage source impedance and the equivalent voltage source voltage. The monitoring system of the present invention comprises a voltage source coupled to a selected one of the lines and operable for providing a constant voltage in opposition to the equivalent source voltage, voltage sensing means coupled to the side of the voltage source opposite the selected line, control means for activating and causing the voltage source to provide the constant voltage for a predetermined period of time sufficient to cause a first steady state voltage to appear at the voltage sensing means and for deactivating the voltage source at the end of the predetermined period of time to cause a second steady state voltage to appear at the voltage sensing means and subtracting means coupled to the sensing means for determining the difference between the magnitudes of the first and second steady state voltages. The monitoring system additionally comprises ratio determining means coupled to the voltage sensing means and to the subtracting means for determining the ratio of the second steady state voltage to the difference between the magnitudes of the first and second steady state voltages and for providing an output voltage which is directly related to the ratio to thereby provide a direct indication of the magnitude of the equivalent source voltage and impedance indication means also coupled to the subtracting means for providing an output voltage which is inversely related to the difference determined by the subtracting means and directly related to the equivalent source impedance for providing a direct indication of the magnitude of the equivalent source impedance.

The present invention also provides a method for monitoring and indicating the magnitudes of the equivalent voltage source impedance and the equivalent voltage source voltage in a telephone system of the type having telephone lines and switching network, wherein operating voltage sources are maintained on the lines to support telephone communication and wherein each line and the network combine to form an equivalent voltage source and an equivalent voltage source impedance. The method of the present invention comprises applying a constant voltage to a selected line in opposition to the equivalent source voltage for a predetermined period of time sufficient to cause a first steady state voltage to appear on the line, terminating the application of the constant voltage until a second steady state voltage appears on the line, sensing the first and second steady state voltages, subtracting the first steady state voltage from the second steady state voltage, determining the ratio between the second steady state voltage to the difference voltage to thereby provide direct indication of the magnitude of the equivalent voltage source voltage, and determining the reciprocal of the difference voltage to provide a signal which is directly related to the equivalent source impedance and for providing a direct indication of the magnitude of the equivalent voltage source impedance.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures in which like reference numerals identify like elements, and in which:

DESCRIPTION OF THE PREFERRED EMBODIMENT

Figure 1:
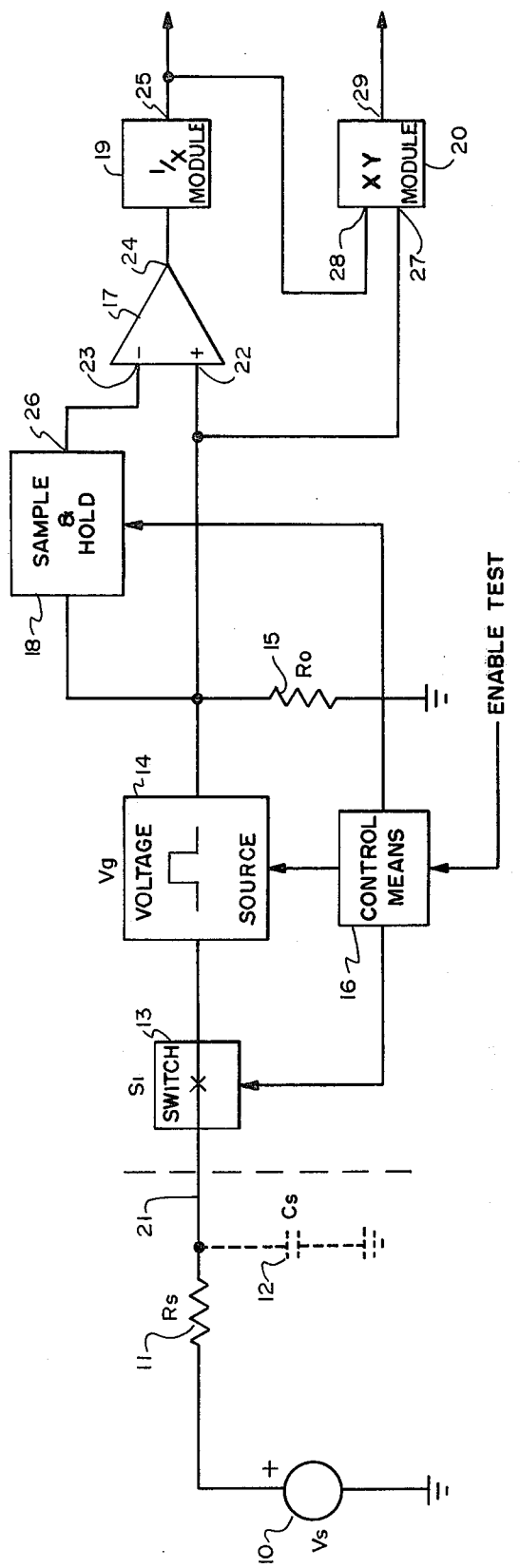
FIG. 1 is a schematic representation partially in block form of a monitoring system embodying the present invention.

Referring now to FIG. 1, the portion of FIG. 1 to the left of the dashed line comprises the Thevenin equivalent circuit of a combined telephone line and its associated network. The Thevenin equivalent circuit comprises an equivalent voltage source 10, an equivalent voltage source impedance represented by resistor 11, and capacitor 12 which represents the distributed capacitance along the telephone line. It is shown in dashed lines to indicate that capacitor 12 is a distributed capacitance and not a discrete capacitor. As well known in the art, telephone lines comprise a line pair commonly referred to a Ring and Tip. As used herein, the term "telephone line" is intended to connote either Ring or Tip lines inasmuch as the monitoring system of the present invention is capable of acting upon either the Ring or Tip side independently. The Figures herein represent the invention in relation to only one of the Ring or Tip lines for simplicity and may be duplicated for servicing both Ring and Tip simultaneously but independently. The portion of FIG. 1 to the right of the dashed line comprises a monitoring system which embodys the present invention and comprises a switch 13 ($S_1$), a voltage source 14 ($V_o$), a voltage sensing means comprising resistor 15 ($R_o$), control means 16, subtracting means 17, sample and hold circuit 18, impedance indicating means comprising the $1/x$ function module 19, and ratio determining means comprising multiplying module 20.

The equivalent voltage source 10, equivalent voltage source impedance 11, and equivalent distributed capacitance 12, comprise the Thevenin equivalent and its associated switching network. The common junction of resistor 11 and distributed capacitance 12 is coupled to the line 21 which represents the telephone line to be monitored. The selection of the line to be monitored is under the control of a network controller of the type well known in the art which may set up the path within the chosen line and the switching network to complete a test telephone call. In so establishing the selected line, the line 21 is connected to switch 13 which is in turn coupled to voltage source 14. Voltage source 14 is coupled to subtracting means 17 which may preferrably be a difference amplifier having a positive input 22 and a negative input 23. Thus, output 24 of difference amplifier 17 will provide a signal whose magnitude is the difference between the voltage at input 22 and the voltage at input 23. Output 24 of difference amplifier 17 is coupled to the impedance indicating means which comprises a $1/x$ function module 19. For reasons to be described hereinafter, the output 25 of the $1/x$ module is proportional to the magnitude of the equivalent voltage source impedance which is utilized for a direct indication of the magnitude of the equivalent voltage source impedance.

The voltage source 14 is also coupled to resistor 15 which serves as a sensing means for sensing the steady state voltages which are produced on line 21 during the test measurement. Sensing means resistor 15 is also coupled to the sample and hold circuit 18 which in turn has an output 26 coupled to input 23 of difference amplifier 17. The sensing means resistor 15 is additionally coupled to the ratio determining means comprising multiplying module 20 at input 27 which has another input 28 coupled to the $1/x$ module 19 at output 25. Lastly, control means 16 is coupled to switch 13 for enabling the monitoring system and to voltage source 14 for causing it to provide a constant voltage in opposition to equivalent voltage source 10 for a predetermined time period. Control means 16 is also coupled to sample and hold circuit 18 for strobing information into the sample and hold circuit to be utilized during the determination of the magnitudes of the equivalent source voltage and the equivalent source voltage impedance.

Figure 2:
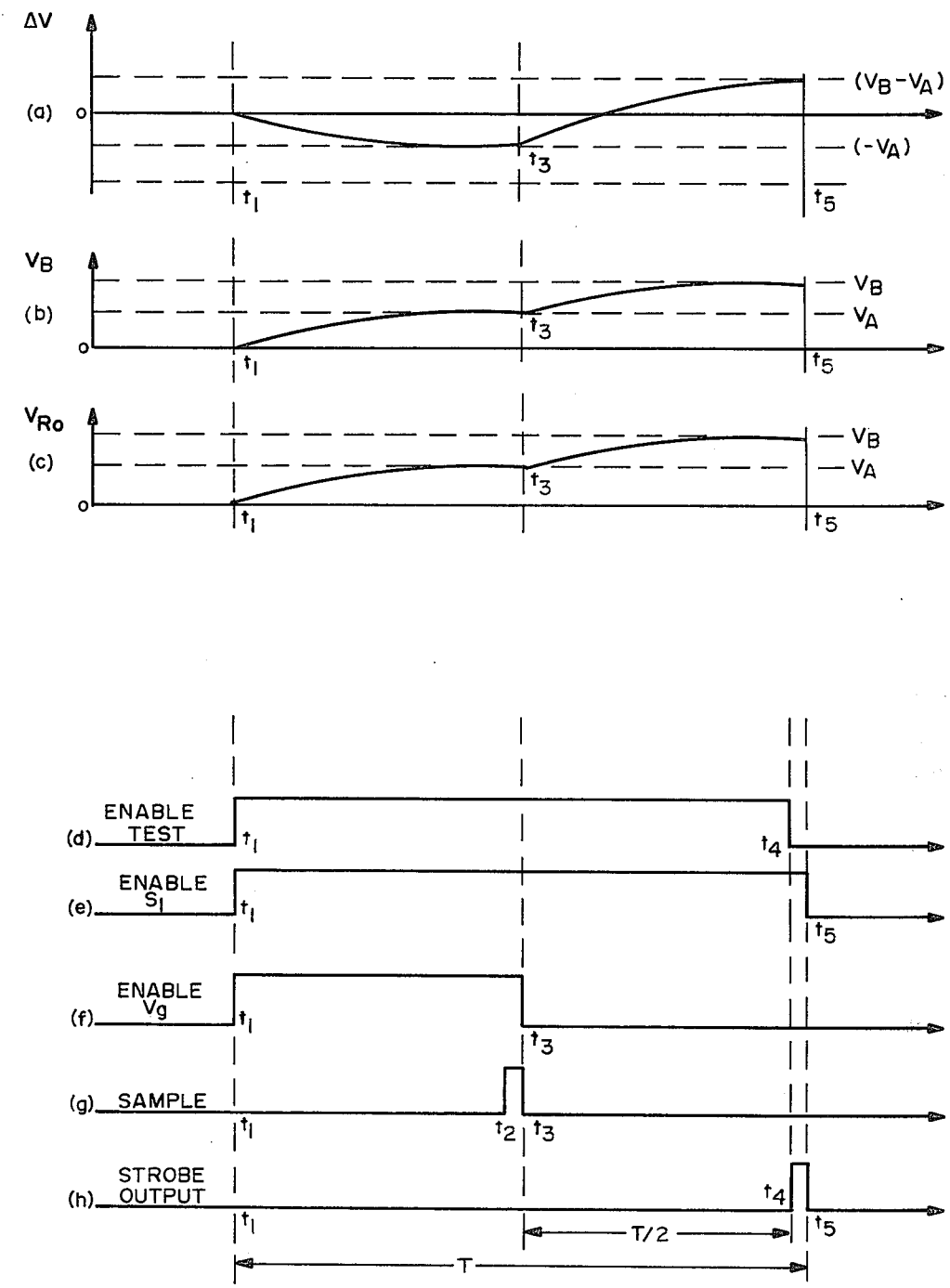
FIG. 2 shows typical waveforms which may be utilized for gaining a better understanding of the operation of the monitoring system of the present invention.

The operation of the monitoring system of FIG. 1 may best be understood with reference to FIG. 2 in conjunction with reference to FIG. 1. The measurement takes place over a fixed finite time of T duration. At $t_1$ the measurement begins when control means 16 receives an enable test signal from the network control and provides an enable signal to switch 13 to cause switch 13 to connect the monitoring system to telephone line 21. At the same time, control means 16 provides voltage source 14 with an enable signal to activate and to cause voltage source 14 to provide a constant voltage ($V_o$) in opposition to equivalent source 10 for a predetermined period of time sufficient to cause a first steady state voltage ($V_A$) to appear at sensing means resistor 15. The predetermined period of time for this embodiment is selected to by T/2. At $t_2$ control means 16 provides a sample signal to sample and hold circuit 18 which then detects and stores the value of the first steady state voltage ($V_A$). At $t_3$, when the sample signal terminates, the enable signal to the voltage source 14 from control means 16 terminates which causes voltage source 14 to be deactivated at the end of the predetermined period of time to cause a second steady state voltage ($V_B$) to appear at voltage sensing means transistor 15. The time duration between $t_1$ and $t_3$ is selected in order to allow the distributed capacitance 12 to be fully charged to the point where the voltage stored in sample and hold circuit 18 is a steady state voltage. After the source 14 has been deactivated for a selected period of time, approximately T/2, the second steady state voltage ($V_B$) will appear at input 22 of difference amplifier 17. At that time, $t_4$, control means 16 provides sample and hold circuit 18 with a strobe input signal to cause it to transfer the value of the first steady state voltage ($V_A$) to the negative input 23 of difference amplifier 17. Just prior to termination of the strobe signal at $t_5$, output 24 of difference amplifier 17 has provided a difference signal which represents the difference between the magnitudes of the second steady state voltage ($V_B$) and the first steady state voltage ($V_A$). At $t_5$ the system has all of the information which it requires in order to make the final determination as to the magnitudes of the equivalent source voltage 10 and the magnitude of the equivalent source voltage impedance 11.

To better understand the manner in which the difference voltage and the second steady state voltage are utilized for determining the magnitudes of the equivalent source voltage and equivalent source voltage impedance, the following algebraic equations may be utilized. For these equations resistor 11 will be represented as $R_s$, resistor 15 will be referred to as $R_0$, the value of the constant voltage provided by voltage source 15 will be referred to as $V_0$, the value of the equivalent source voltage will be represented as $V_s$, and the first and second steady state voltages will be referred to as $V_A$ and $V_B$ respectively.

The two levels of voltage are introduced into the network through the voltage source 14 because two independent conditions in a linear network allow solution of two simultaneous equations for the two unknowns $V_s$ and $R_s$. The two conditions of voltages $V_0$ volts and 0 volts by voltage source 14 may be chosen arbitrarily to simplify hardware implementation. The algebraic solution proceeds as follows:

In general:

$$V = \frac{(V_s - V_g) R_0}{R_0 + R_s}$$

1. Let $V = V_A$ at $V_g = V_0$,
then $$V_A = \frac{(V_s - V_0) R_0}{R_0 + R_s}$$

2. Let $V = V_B$ at $V_g = 0$,
then $$V_B = \frac{(V_s) R_0}{R_0 + R_s}$$

The two equations can now be solved for $V_s$ and $R_s$ as functions of $V_A$ and $V_B$ ($V_0$ and $R_0$ are known constants). The solution is:

$$V_s = \frac{(V_0)(V_B)}{(V_B - V_A)} \text{ and } R_s = (R_0) \left[ \left( \frac{V_0}{(V_B - V_A)} \right) - 1 \right]$$

It is not desired to have the distributed capacitance 12 effect the solution. Therefore sufficient time is allowed for a capacitance 12 to charge or discharge during each half cycle of the measurement process.

The solutions to the equations can be simplified further as follows:

Let $\Delta V = V_B - V_A$, then $$|V_s| = \frac{(V_0)|V_B|}{\Delta V} \text{ and } R_s = (R_0) \left[ \frac{V_0}{\Delta V} - 1 \right]$$

It can be seen from the foregoing, that the magnitude of the equivalent voltage source impedance 11 is inversely proportional to the difference between the second steady state voltage and the first steady state voltage. All other parameters of the voltage source impedance relationship are known constants. Thus, the output signal at output 24 of difference amplifier 17 is a signal which is inversely proportional to the magnitude of the equivalent source voltage impedance. By coupling output 24 of difference amplifier 17 to the $1/x$ module, output 25 of module 19 will provide a signal which is directly proportional to the magnitude of the equivalent source impedance. By transferring this signal to suitable linear amplifier for multiplying it by a suitable constant, a direct indication of the equivalent source voltage impedance may be obtained.

Also as a result of the foregoing equations, it can be seen that the magnitude of the equivalent source voltage is directly proportional to the ratio of the second steady state voltage ($V_B$) and the difference between the second steady state voltage and the first steady state voltage. Because the $1/x$ module 19 provides the inverse of the difference between the steady state voltages, output 25 of module 19 is coupled to input 28 of multiplying module 20. The second steady state voltage term is provided at input 27 of multiplying module 20 by being coupled to a sensing means resistor 15. Thus, module 20 takes the second steady state voltage ($V_B$) and multiplies it by the inverse of the difference signal to obtain the ratio of the second steady state voltage $V_B$ to the difference voltage ($V_B - V_A$). Therefore output 29 of module 28 may be coupled to a suitable amplifier for multiplying the resultant ratio signal by a suitable constant for obtaining a direct indication of the magnitude of the equivalent voltage source 10.

Figure 3:
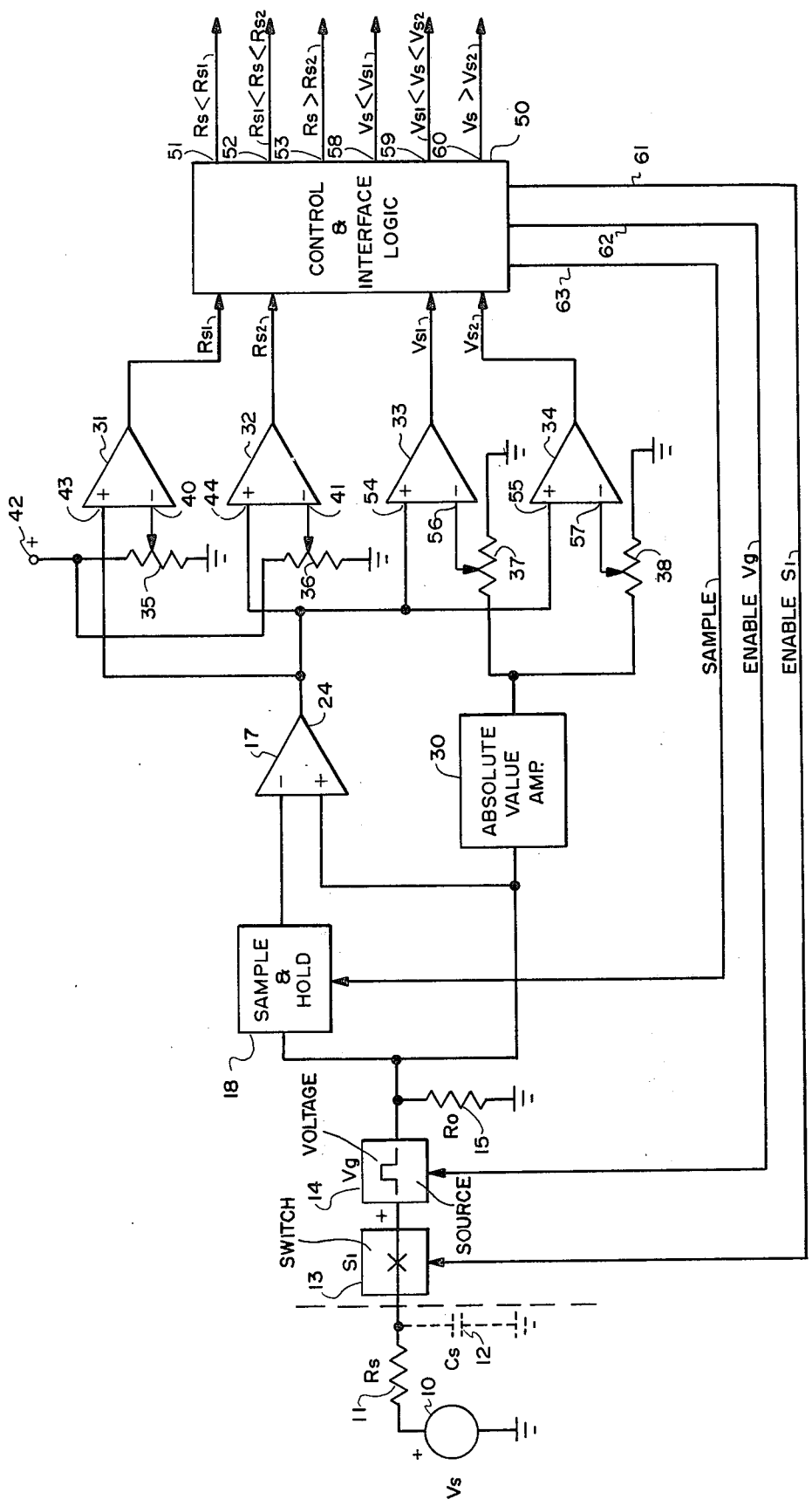
FIG. 3 is a circuit diagram of a monitoring system which embodies further aspects of the present invention.

The embodiment of FIG. 1 provides analog values for the magnitude of the equivalent voltage source and the magnitude of the equivalent voltage source impedance. Often times, such analog values are not necessary and in fact it may be desirable to only know in which range of a plurality of predetermined ranges the magnitudes lie. To this extent, simple comparators may be utilized for establishing the predetermined ranges and for forming the natural discriminating functions to determine in which ranges the magnitudes of the equivalent voltage source voltage and equivalent source voltage impedance lie. FIG. 3 shows such an embodiment. As to those elements of FIG. 3 which find correspondence to elements in FIG. 1 the same reference numerals have been retained.

The embodiment of FIG. 3 generates the difference voltage ($V_B - V_A$) and the value of the second steady state voltage ($V_B$) in an identical manner as the embodiment of FIG. 1 except that the embodiment of FIG. 3 includes an absolute value amplifier which rectifys the second steady state voltage and provides the absolute value of it.

In addition to switch 13, voltage source 14, sensing resistor 15, sample and hold 18, difference amplifier 17, and absolute value amplifier 30, FIG. 3 includes a first plurality of comparators 31 and 32, a second plurality of comparators 33 and 34, a like first set of voltage reference sources 35 and 36, and a like second plurality of voltage dividers 37 and 38.

Comparators 31 and 32 which comprise the first plurality of comparators have reference inputs 40 and 41 respectively each being coupled to a respective given one of the reference voltage sources 35 and 36. To that end, input 40 is coupled to reference voltage source 35 and input 41 is coupled to reference voltage source 36. Each of the reference voltage sources comprises a voltage divider coupled to a positive voltage source terminal 42 and arranged in a conventional well known manner. They establish the predetermined ranges of the equivalent voltage source impedances and each provides a different reference voltage or potential.

Each of comparators 31 and 32 has another input 43 and 44 respectively coupled to the subtracting means difference amplifier 17 for receiving the difference voltage which it generates at output 24. Should one of the comparators have a reference potential at its reference input which is less than the difference voltage ($V_B - V_A$) it will provide a first signal which is a high logic level and should one of the comparators be coupled to a reference potential at its reference input which is greater than the difference voltage, it will provide a second signal which is a low logic level.

The reference voltages, inasmuch as the equivalent source voltage impedance is directly related to the inverse of the magnitude of the difference voltage establish the different ranges in which magnitude of the equivalent voltage source impedance may lie. For example, in operation, assuming that the reference voltage supplied by reference voltage source 35 is $V_{rf1}$ and that the reference voltage supplied by reference voltage source 36 is $V_{rf2}$, and assuming that $V_{rf1}$ is greater than $V_{rf2}$, should the difference voltage be greater than $V_{rf1}$, comparators 31 and 32 will both provide the first signal which is a high logic level which indicates that the equivalent voltage source impedance is less than $R_{s1}$. Should the difference voltage be less than $V_{rf1}$ but greater than $V_{rf2}$, comparator 31 will provide the second signal which is a low logic level and comparator 32 will provide the first signal which is the high logic level which indicates that the magnitude of the equivalent source voltage impedance is less than $R_{s2}$ but greater than $R_{s1}$. Lastly, should the difference voltage be less than $V_{rf2}$, both comparator 31 and comparator 32 will provide the second signal which is a low output level indicating that the magnitude of the equivalent voltage source impedance is greater than $R_{s2}$.

The control and interface logic 50 may include logic circuitry of the type well known in the art which is responsive to the first and second signals of comparators 31 and 32 to provide at outputs 51, 52 and 53 a discrete indication as to which range the magnitude of the equivalent voltage source impedance lies.

In a somewhat similar manner the magnitude of the equivalent source voltage may also be assigned to one of a given number of predetermined ranges. To this end, the monitoring system of FIG. 3 includes a second plurality of comparators comprising comparators 33 and 34. Each comparator of the second plurality includes a first input, comparator 33 having first input 54 and comparator 34 having first input 55. Inputs 54 and 55 are coupled to output 24 of difference amplifier 17 to receive the difference voltage therefrom. Each of the second plurality of comparators also has a second input, comparator 33 having second input 56 and comparator 34 having second input 57. The monitoring system of FIG. 3 also includes a like second plurality of voltage dividers comprising variable resistors 37 and 38. Input 56 of comparator 33 is coupled to resistor 37 and input 57 of comparator 34 is coupled to resistor 38. Resistors 37 and 38 are coupled on one side of the absolute value amplifier 30 for receiving the second steady state voltage ($V_B$) and having the other sides coupled to ground. Thus, each of the voltage dividers comprising resistors 37 and 38 provide a predetermined portion of the second steady state voltage to each of the second inputs 56 and 57 which herein may be referred to as reference inputs. In this manner, the ranges into which the magnitude of the equivalent voltage source voltage may lie are established.

Recalling for a moment that the magnitude of the equivalent source voltage is proportional to the ratio of the second steady state voltage ($V_B$) to the difference voltage ($V_B - V_A$), the predetermined portions of the second steady state voltage applied to inputs 56 and 57 may be selected to establish thresholds by which the magnitude of the equivalent source voltage may be discriminated against for determining into which range of voltages the magnitude of the equivalent source voltage lies. Assuming for this preferred embodiment that resistor 38 provides input 57 with a lesser portion of the second steady state voltage than that provided to input 56 by resistor 37, three different voltage ranges may be established wherein the magnitude of the equivalent source voltage ($V_s$) is less than $V_{s1}$, is greater than $V_{s1}$ but less than $V_{s2}$, and greater than $V_{s2}$.

The range in which the magnitude of the equivalent source voltage lies is determined as follows. If the magnitude of the second steady state voltage ($V_B$) is of a low enough level such that the reference voltages applied to inputs 56 and 57 of comparators 33 and 34 are less than the difference voltage, comparators 33 and 34 provide a first signal which is a high logic level indicating that the magnitude of the equivalent source voltage ($V_s$) is less than $V_{s1}$. If the magnitude of $V_B$ is such that input 57 of comparator 34 has a lower reference voltage than the difference voltage at input 55, and input 56 of comparator 33 has a reference voltage which is greater than the difference voltage at input 54, comparator 34 will provide the first signal and comparator 33 will provide a second signal which is a low logic level to indicate that the magnitude of the equivalent source voltage is in between $V_{s1}$ and $V_{s2}$. In other words, the magnitude of the equivalent source voltage will be greater than $V_{s1}$ but less than $V_{s2}$. Lastly, if $V_B$ is high enough such that inputs 57 and 56 are greater than the difference voltage at inputs 55 and 54, comparators 33 and 34 will both provide the second signal which is a low logic level to indicate that the magnitude of the equivalent source voltage is greater than $V_{s1}$.

Control and interface logic 50 which constitutes an indication means, as in the case for indicating the range in which the equivalent voltage source impedance lies, also has similar logic circuitry of the type well known in the art for providing at outputs 58, 59 and 60 a discrete indication as to which range the magnitude of the equivalent source voltage lies. Of course, the control and interface logic may be followed by additional logic circuitry which logically groups the various combinations of the impedance magnitude and voltage magnitude ranges.

As in the embodiment of FIG. 1, the monitoring system is controlled under the commands by the control and interface logic 50 which provides an enable signal over line 61 to switch 13 for connecting the monitoring system to the selected line. Also, an enable signal is generated on line 62 which is coupled to voltage source 14 for activating and causing it to provide the constant voltage in opposition to the equivalent source voltage ($V_s$) for the predetermined period of time sufficient to cause the first steady state voltage to appear at sensing means resistor 15. A sample signal is generated over line 63 which is coupled to sample and hold circuit 18 for causing the first steady state voltage to be stored in sample and hold circuit 18. After the first steady state voltage is sampled and stored, line 62 discontinues its enabling signal to voltage source 14 for terminating the application of the constant voltage to allow the second steady state voltage to appear at sensing resistor 15. At this point in time, the difference amplifier and comparators may be strobed to cause the difference voltage to appear at output 24 and to cause the comparators 31 through 34 to perform their comparisons for determining into which range the magnitudes of the equivalent source voltage and equivalent voltage source impedance lie. The control and interface logic 50 may be followed by an additional logic stage of the type well known in the art to logically combine the discrete voltage and impedance outputs 51 through 53 and 58 through 60 to form a logic combination. The resulting logic combination may then be compared to stored logic combinations in the network controller to determine if harmful conditions exist on the line.

Figure 4:
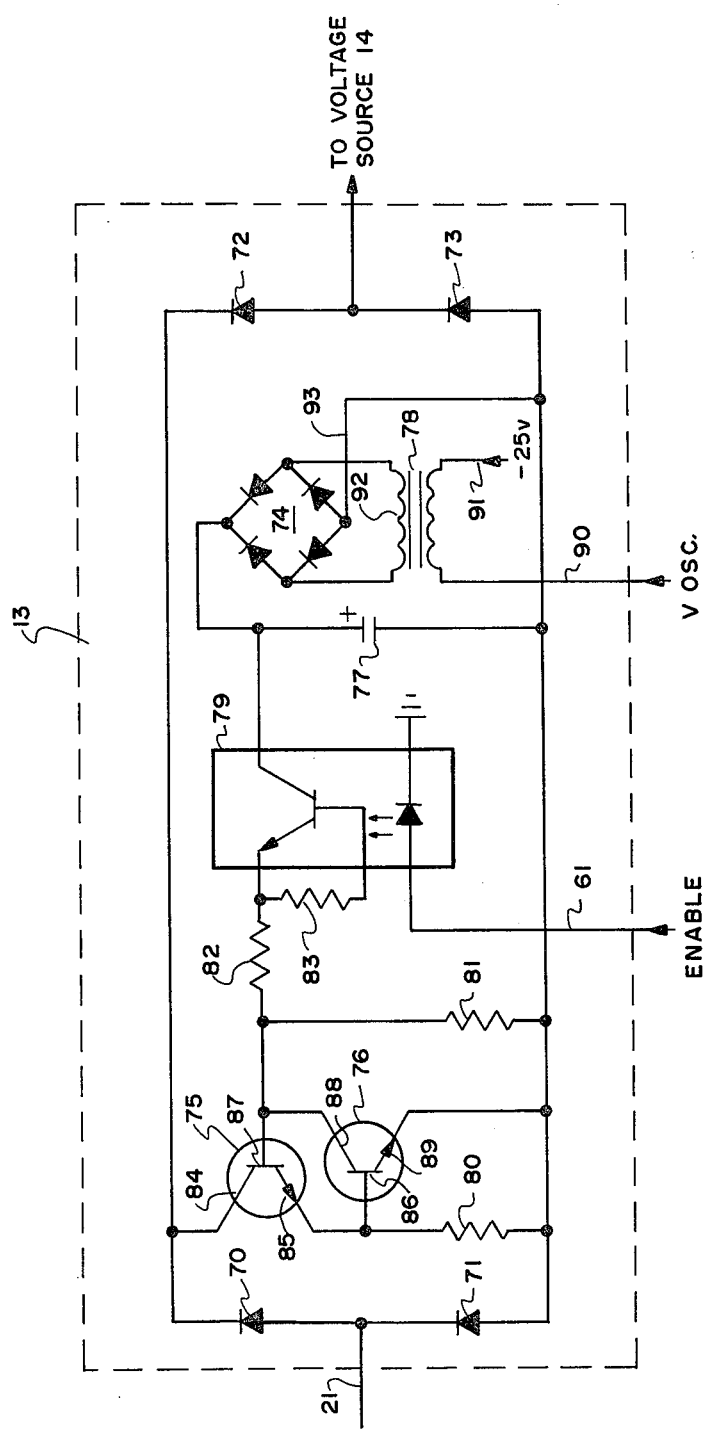
FIG. 4 is a schematic circuit diagram of a portion of the monitoring systems of FIGS. 1 and 3.

FIG. 4 shows a circuit schematic diagram of a switch which may be utilized in the embodiments of FIGS. 1 and 3 for switch 13. It comprises a first diode-bridge comprising diodes 70 through 73, a second diode-bridge 74, transistors 75 and 76, capacitor 77, transformer 78, optical isolator 79 and resistors 80 through 83.

Diodes 70 and 71 have a common junction which is coupled to the telephone line 21. Diodes 72 and 73 have a common junction which is coupled to the voltage source 14 as indicated by the arrow of FIGS. 1 and 3. Transistor 75 has a collector 84 coupled to the common junction of diodes 70 and 72, an emitter 85 coupled to base 86 of transistor 76 and to the common junction of diodes 71 and 73 by resistor 80. Transistor 75 also has a base 87 coupled to collector 88 of transistor 76, to the common junction of diode 71 and 73 by resistor 81, and to the optical isolator 79 by resistor 82. Transistor 76 has an emitter 89 coupled to the common junction of diode 71 and 73.

The optical isolator 79 is coupled to the second diode-bridge 74 and to the control means via line 61 for example as illustrated in FIG. 3 for receiving its enable input from the control means. The second diode-bridge 74 is also coupled to the common junction of diode 71 and 73 by capacitor 77. Transformer 78 has a primary winding coupled on one side to a square-wave oscillator on line 90 and to a negative voltage supply at terminal 91. Transformer 78 also has a secondary 92 coupled across the second diode-bridge 74. Diode-bridge 74 is also directly coupled to the common junction of diodes 71 and 73 by line 93.

The switch 13 of FIG. 4 is implemented as a high-voltage bi-polar transistor in a diode-bridge configuration. One requirement is to have the switch 13 "floating" relative to ground. To satisfy this requirement, the bias voltage to turn transistor 75 on is supplied by transformer 78 which is driven by a square-wave oscillator source at line 90. The voltage at secondary 92 of transformer 78 is rectified by the second diode-bridge 74. This bias voltage is applied to the base of pass transistor 75 through the optical isolator 79 which is actuated by the control logic over enable input line 61.

The pass transistor 75 is configured for emitter degenerative feedback by transistor 76 so that transistor 75 may be current limited. This assures that no damaging surge currents will pass through the network contacts. As can be seen from FIG. 4, switch 13 is bi-lateral, that is to say it conducts current in either direction, because the line voltage may be either positive or negative.

Figure 5:
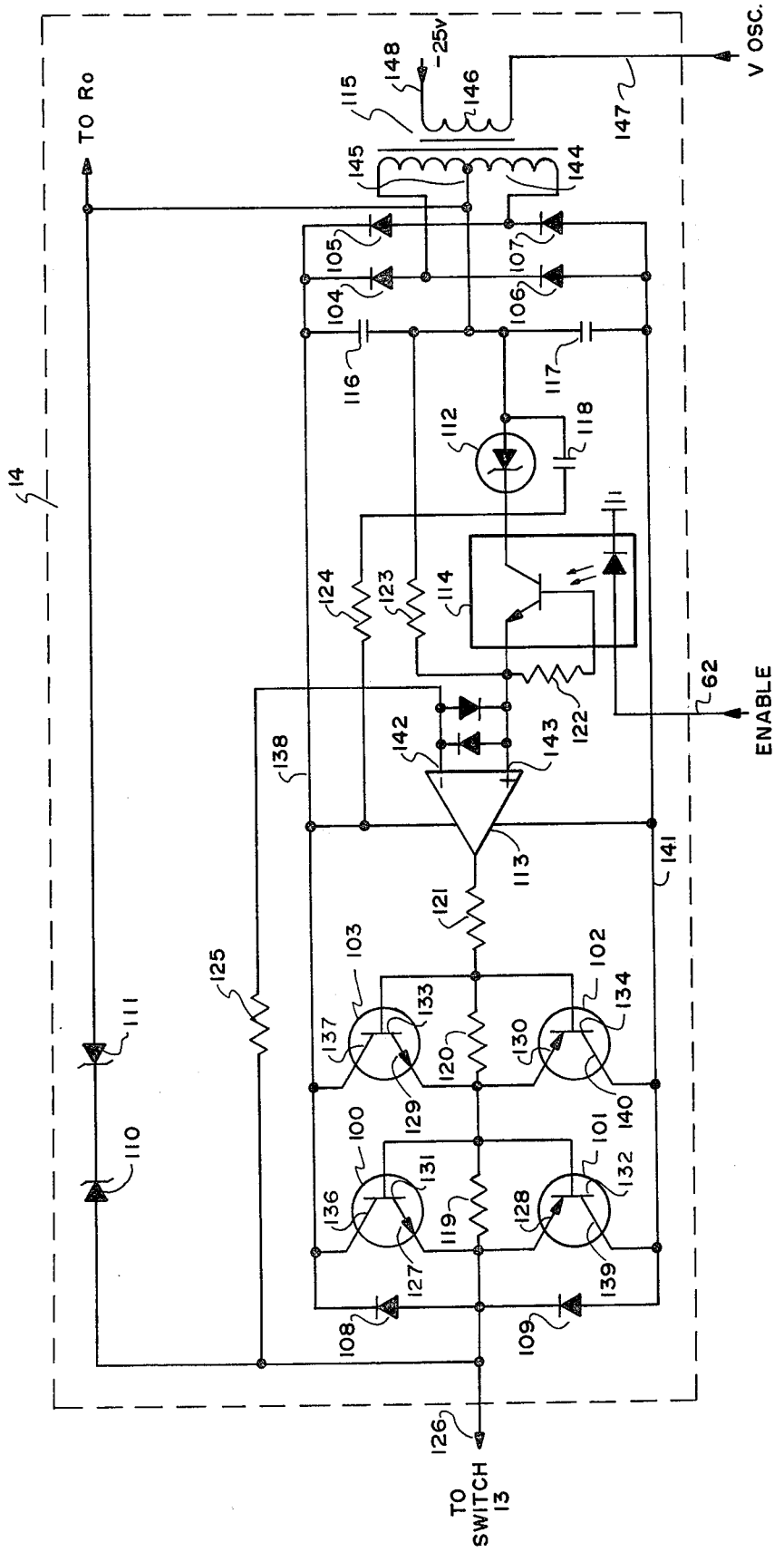
FIG. 5 is another schematic circuit diagram of another portion of the monitoring systems of FIGS. 1 and 3.

Referring now to FIG. 5, there is shown a schematic circuit diagram of a voltage source 14 which may be utilized in practicing the embodiments of FIGS. 1 and 3. It comprises transistors 100 through 103, a diode bridge comprising diodes 104 through 107, diodes 108 and 109, zener diodes 110, 111 and 112, operational amplifier 113, optical isolator 114, transformer 115, capacitors 116, 117 and 118, and resistors 119 through 125.

Voltage source 14 has an output 126 which is coupled to switch 13 of either FIG. 1 or FIG. 3. Transistors 100 and 101 have emitters 127 and 128 respectively which are coupled together, to the common junction of diodes 108 and 109, to output 126, and to emitters 129 and 130 of transistors 103 and 102 respectively by resistors 119. Bases 131 and 132 of transistors 100 and 101 respectively are coupled together and to emitters 129 and 130 of transistors 103 and 102 respectively. Bases 133 and 134 of transistors 103 and 102 respectively are coupled together, to emitters 129 and 130 by resistor 120, and to the output 135 of operational amplifier 113 by resistor 121. Diode 108 is coupled across emitter 127 and collector 136 of transistor 100. Collector 136, collector 137, operational amplifier 113, capacitor 116, and diodes 104 and 105 are all coupled together on line 138. Diode 109 is coupled across emitter 128 and collector 139 of transistor 101. Collector 139, collector 140, operational amplifier 113, capacitor 117, and diodes 106 and 107 are all coupled together by line 141.

Operational amplifier 113 has a negative input 142 coupled to output 126 by resistor 125 and a positive input 143 which is coupled to the optical isolator 114 and to the common junction of capacitor 116, capacitor 117, and zener diode 112 by resistor 123. Input 143 is also coupled to the optical isolator by resistor 122.

Zener diode 112 has capacitor 118 coupled across it and is also coupled to the optical isolator 114 and to line 138 by resistor 124. As can be seen from the Figure, diodes 104 through 107 are configured in a diode-bridge configuration which is coupled to the center-tapped secondary 144 of transformer 115. Center tap 145 of transformer 115 is coupled to the sensing means resistor $R_0$. The primary 146 of transformer 115 is coupled to a square-wave voltage oscillator at line 147 and to a negative power source at terminal 148. Center tap 145 is also coupled to zener diode 112.

The voltage source 14 of FIG. 5 is implemented as a servo-amplifier operating as a voltage follower. The output stage comprising transistors 100 through 103 is a totem-pole configuration to allow current flow as a source or sink. This is required to guarantee the correct sensing of the first and second steady state voltages because a constant voltage difference must be maintained in the series path for either direction of current flow. The amplifier may be better defined as a voltage follower with power gain that follows the voltage present at the positive terminal 43 of the operational amplifier 113. This constant voltage difference is 0 volts relative to $R_{0\text{leq}}$ of the series circuit comprising transformer center tap 145 when the optically coupled isolator 114 is off (open circuit) or a fixed positive voltage ($V_0$) generated by zener diode 112 when the optically coupled isolator 114 is on. As in the case of switch 13, the voltage source 14 must be "floating" relative to ground. To this end, power is derived by transformer 115 for the amplifier from the square-wave oscillator source on line 147 which is rectified by the diode-bridge comprising diodes 104 through 107. The optically coupled isolator 114 is actuated by the control logic or control means over line 62 as represented in FIG. 3.

The present invention therefore provides a monitoring system for determining and indicating the magnitudes of the equivalent source voltage and equivalent voltage source impedance on a telephone line. The determination can be made such that an absolute or analog value is obtained or the magnitudes may be assigned to one of a number of predetermined ranges for translating the information into a digital format to be used by the network control logic in a telephone exchange. The monitoring system of the present invention may be duplicated for both the ring and tip side of the telephone line and the determinations may be performed independently for either the ring or the tip side of the line.

While a particular embodiment of the invention has been shown and described, modifications may be made, and it is intended in the appended claims to cover all such modifications as may fall within the true spirit and scope of the invention.

I claim:

1. In a telephone system of the type having telephone lines and a switching network, wherein operating voltage sources are maintained on the lines to support telephone communication and wherein each line and the network combine to form an equivalent voltage source and an equivalent voltage source impedance, a monitoring system for indicating the magnitude of the real part of the equivalent voltage source impedance comprising:
   a voltage source coupled to a selected one of the lines and operable for providing a constant voltage in opposition to the equivalent source voltage;
   voltage sensing means coupled to the side of said voltage source opposite the selected line;
   control means for activating and causing said voltage source to provide said constant voltage for a predetermined period of time sufficient to cause a first steady state voltage to appear at said voltage sensing means and for deactivating said voltage source at the end of said predetermined period of time to cause a second steady state voltage to appear at said voltage sensing means;
   subtracting means coupled to said sensing means for determining the difference between the magnitudes of said first and second steady state voltages; and
   indicating means coupled to said subtracting means for providing an output voltage which is inversely related to said difference determined by said subtracting means and directly related to the real part of said equivalent source impedance for providing a direct indication of the magnitude of the real part of said equivalent source impedance.

2. In a telephone system of the type having telephone lines and a switching network, wherein operating voltage sources are maintained on the lines to support telephone communication and wherein each line and the network combine to form an equivalent voltage source and an equivalent voltage source impedance, a monitoring system for indicating the magnitude of the equivalent voltage source comprising:
   a voltage source coupled to a selected one of the lines and selectively operable for providing a constant voltage in opposition to the equivalent source voltage;
   voltage sensing means coupled to the side of said voltage source opposite the selected line;
   control means for activating and causing said voltage source to provide said constant voltage for a predetermined period of time sufficient to cause a first steady state voltage to appear at said voltage sensing means and for deactivating said voltage source at the end of said predetermined period of time to cause a second steady state voltage to appear at said voltage sensing means;
   subtracting means coupled to said sensing means for determining the difference between the magnitudes of said first and second steady state voltages; and
   ratio determining means coupled to said voltage sensing means and to said subtracting means for determining the ratio of said second steady state voltage to the difference between the magnitudes of said first and second steady state voltages and for providing an output voltage which is directly related to said ratio to thereby provide a direct indication of the magnitude of said equivalent source voltage.

3. In a telephone system of the type having telephone lines and a switching network, wherein operating voltage sources are maintained on the lines to support telephone communication and wherein each line and the network combine to form an equivalent voltage source and an equivalent voltage source impedance, a monitoring system for indicating the magnitudes of the real part of the equivalent voltage source voltage comprising:
   a voltage source coupled to a selected one of the lines and operable for providing a constant voltage in opposition to the equivalent source voltage;
   voltage sensing means coupled to the side of said voltage source opposite the selected line;
   control means for activating and causing said voltage source to provide said constant voltage for a predetermined period of time sufficient to cause a first steady state voltage to appear at said voltage sensing means and for deactivating said voltage source at the end of said predetermined period of time to cause a second steady state voltage to appear at said voltage sensing means;
   subtracting means coupled to said sensing means for determining the difference between the magnitudes of said first and second steady state voltages;
   ratio determining means coupled to said voltage sensing means and to said subtracting means for determining the ratio of said second steady state voltage to the difference between the magnitudes of said first and second steady state voltages and for providing an output voltage which is directly related to said ratio to thereby provide a direct indication of the magnitude of said equivalent source voltage; and indicating means also coupled to said subtracting means for providing an output voltage which is inversely related to said difference determined by said subtracting means and directly related to the real part of said equivalent source impedance for providing a direct indication of the magnitude of the real part of said equivalent source impedance.

4. A monitoring system in accordance with claim 3 further comprising switch means coupled between the line to be monitored and said voltage source and also coupled to said control means, and wherein said control means further comprises means for enabling said switch means prior to the activation of said voltage source to thereby connect said voltage source to said line.

5. A monitoring system in accordance with claim 3 wherein said subtracting means comprises a difference amplifier.

6. A monitoring system in accordance with claim 3 wherein said indicating means comprises a reciprocal function module.

7. A monitoring system in accordance with claim 6 wherein said ratio determining means comprises a reciprocal function module coupled to said subtracting means and a multiplication module having a first input coupled to said reciprocal function module and a second input coupled to said sensing means whereby said multiplication module multiplies the reciprocal of said difference voltage by said second steady state voltage to derive said output voltage which is a direct indication of the magnitude of said equivalent source voltage.

8. In a telephone system of the type having telephone lines and a switching network, wherein operating voltage sources are maintained on the lines to support telephone communication and wherein each line and the network combine to form an equivalent voltage source and an equivalent voltage source impedance, a monitoring system for indicating the magnitude range out of a plurality of possible ranges in which the magnitude of the real part of the equivalent voltage source impedance lies comprising:

a voltage source coupled to a selected one of the lines and operable for providing a constant voltage in opposition to the equivalent source voltage;

voltage sensing means coupled to the side of said voltage source opposite the selected line;

control means for activating and causing said voltage source to provide said constant voltage for a predetermined period of time sufficient to cause a first steady state voltage to appear at said voltage sensing means and for deactivating said voltage source at the end of said predetermined period of time to cause a second steady state voltage to appear at said voltage sensing means;

subtracting means coupled to said sensing means for determining the difference between the magnitudes of said first and second steady state voltages and having an output for providing a difference voltage responsive thereto;

a plurality of comparators and a like plurality of reference voltage sources, each said comparator including a reference input, a given respective one of said reference inputs being coupled to a given responsive one of said reference voltage sources to thereby establish the possible plurality of ranges, each of said comparators additionally having another input coupled to said output of said subtracting means, whereby those comparators which are coupled to a reference potential which is less than said difference voltage will provide a first signal and those comparators which are coupled to a reference potential which is greater than said difference voltage will provide a second signal to thereby define the range in which the real part of the equivalent voltage source impedance lies; and indicating means coupled to said comparators and responsive to said first and second signals for providing a discrete indication of the range in which the magnitude of the real part of the equivalent source impedance lies.

9. In a telephone system of the type having telephone lines and a switching network, wherein operating voltage sources are maintained on the lines to support telephone communication and wherein each line and the network combine to form an equivalent voltage source and an equivalent voltage source impedance, a monitoring system for indicating the magnitude range out of a plurality of possible ranges in which the magnitude of the equivalent voltage source voltage lies comprising:

a voltage source coupled to a selected one of the lines and operable for providing a constant voltage in opposition to the equivalent source voltage;

voltage sensing means coupled to the side of said voltage source opposite the selected line;

control means for activating and causing said voltage source to provide said constant voltage for a predetermined period of time sufficient to cuase a first steady state voltage to appear at said voltage sensing means and for deactivating said voltage source at the end of said predetermined period of time to cause a second steady state voltage to appear at said voltage sensing means;

subtracting means coupled to said sensing means for determining the difference between the magnitudes of said first and second steady state voltages and having an output for providing a difference voltage responsive thereto;

a plurality of comparators, each said comparator having a first input and a second input, each said first input being coupled to said subtracting means output for receiving said difference voltage;

a like plurality of voltage dividers coupled to said sensing means for receiving said second steady state voltage and having an output for providing a predetermined portion of said second steady state voltage as a reference potential, each said divider output providing a different reference potential to thereby establish said ranges, and each respective given one of said divider outputs being coupled to a given respective one of said second inputs of said comparators, whereby with said first inputs being coupled to said difference voltage and with each said second input being coupled to a different reference potential, the ratio of the second steady state voltage to the difference voltage which is directly related to the magnitude of the equivalent voltage source voltage may be determined such that those comparators having a reference potential which is less than said difference voltage will provide a first signal and those comparators which have a reference potential which is greater than said difference voltage will provide a second signal to thereby define the range in which the equivalent voltage source voltage magnitude lies; and indicating means coupled to said comparators and responsive to said first and second signals for providing a discrete indication of the range in which the equivalent voltage source voltage magnitude lies.

10. In a telephone system of the type having telephone lines and a switching network, wherein operating voltage sources are maintained on the lines to support telephone communication and wherein each line and the network combine to form an equivalent voltage source and an equivalent voltage source impedance, a monitoring system for indicating the magnitude range out of a plurality of possible ranges in which the magnitudes of the real part of the equivalent voltage source impedance and equivalent voltage source voltage lie comprising:

a voltage source coupled to a selected one of the lines and operable for providing a constant voltage in opposition to the equivalent source of voltage;

voltage sensing means coupled to the side of said voltage source opposite the selected line;

control means for activating and causing said voltage source to provide said constant voltage for a predetermined period of time sufficient to cause a first steady state voltage to appear at said voltage sensing means and for deactivating said voltage source at the end of said predetermined period of time to cause a second steady state voltage to appear at said voltage sensing means;

subtracting means coupled to said sensing means for determining the difference between the magnitudes of said first and second steady state voltages and having an output for providing a difference voltage responsive thereto;

a first plurality of comparators and a like first plurality of reference voltage sources, each said comparator of said first plurality including a reference input, a given respective one of said reference inputs being coupled to a given respective one of said reference voltage sources to thereby establish the possible plurality of ranges in which the magnitude of the real part of the equivalent voltage source impedance lies, each of said comparators additionally having another input coupled to said output of said subtracting means, whereby those comparators which are coupled to a reference potential which is less than said difference voltage will provide a first signal and those comparators which are coupled to a reference potential which is greater than said difference voltage will provide a second signal to thereby define the range in which the magnitude of the real part of the equivalent voltage source impedance lies;

a second plurality of comparators, each said comparator of said second plurality having a first input and a second input, each said first input being coupled to said subtracting means output for receiving said difference voltage;

a like second plurality of voltage dividers coupled to said sensing means for receiving said second steady state voltage and having an output for providing a predetermined portion of said second steady state voltage as second reference potentials, each said divider output providing a different second reference potential to thereby establish said ranges in which the magnitude of the equivalent voltage source voltage lies, and each respective given one of said divider outputs being coupled to a given respective one of said second inputs of said second plurality of comparators, whereby with said first inputs being coupled to said difference voltage and with each said second input of said second comparator coupled to a different second reference potential, the ratio of the second steady state voltage to the difference voltage which is directly related to the magnitude of the equivalent voltage source voltage may be determined such that those comparators of the second plurality having a second reference potential which is less than said difference voltage will provide a third signal and those comparators of said second plurality which have a second reference potential which is greater than said difference voltage will provide a fourth signal to thereby define the range in which the real part of the equivalent voltage source voltage magnitude lies; and indicating means coupled to said first plurality of comparators and to said second plurality of said comparators and responsive to said first, second, third and fourth signals for providing a discrete indication of the ranges in which the magnitudes of the equivalent source impedance and the equivalent voltage source voltage lie.

11. A monitoring system in accordance with claim 10 further comprising switch means coupled between the line to be monitored and said voltage source and also coupled to said control means, and wherein said control means further comprises means for enabling said switch means prior to the activation of said voltage source to thereby connect said voltage source to said line.

12. A monitoring system in accordance with claim 10 wherein said subtracting means comprises a difference amplifier.

13. A monitoring system in accordance with claim 10 further comprising a sample and hold circuit coupled to said sensing means and to said subtracting means for temporarily storing said first steady state voltage wherein said sample and hold circuit is also coupled to said control means, and wherein said control means includes strobe means for causing said sample and hold circuit to transfer said first steady state voltage to said subtracting means.

14. A method of monitoring and indicating the magnitudes of the real part of the equivalent voltage source impedance and the equivalent voltage source voltage in a telephone system of the type having telephone lines and a switching network, wherein operating voltage sources are maintained on the lines to support telephone communication and wherein each line and the network combine to form an equivalent voltage source and an equivalent voltage source impedance, the method comprising the steps of:

applying a constant voltage to a selected line in opposition to the equivalent source voltage for a predetermined period of time sufficient to cause a first steady state voltage to appear on the line, sensing the magnitude of said first steady state voltage, terminating the application of the constant voltage until a second steady state voltage appears on the line, sensing the magnitude of said second steady state voltage;

subtracting the magnitude of said first steady state voltage from the magnitude of said second steady state voltage to thereby provide a difference;

determining the ratio between the magnitude of said second steady voltage to the magnitude of said difference to thereby provide a direct indication of the magnitude of the equivalent voltage source voltage, and determining the reciprocal of the magnitude of said difference to provide a direct indication of the magnitude of the real part of the equivalent voltage source impedance.

15. A method in accordance with claim 14 wherein said reciprocal of said difference is determined by generating a difference voltage having a magnitude equal to the difference between the magnitude of said first and second steady voltages and thereafter comparing said difference voltage to a plurality of reference voltages to thereby provide an indication as to in which range the magnitude of the real part of the equivalent source impedance lies out of a predetermined plurality of ranges established by said reference voltages.

16. A method in accordance with claim 14 wherein said ratio is determined by generating a difference voltage having a magnitude equal to the difference between the magnitudes of said first and second steady voltages and thereafter comparing said difference voltage to a plurality of predetermined portions of said second steady voltage to thereby provide an indication as to in which range said ratio lies out of a predetermined plurality of ranges established by said plurality of second steady state voltage portions.

* * * * *

UNITED STATES PATENT AND TRADEMARK OFFICE
CERTIFICATE OF CORRECTION

PATENT NO. : 4,006,319
DATED : February 1, 1977
INVENTOR(S) : Todd H. Gartner

It is certified that error appears in the above-identified patent and that said Letters Patent are hereby corrected as shown below:

Column 14, line 33, "cuase" should be --cause--

Column 16, lines 18-19, delete "real part of the"

Signed and Sealed this

Seventh Day of June 1977

[SEAL]

Attest:

RUTH C. MASON
Attesting Officer

C. MARSHALL DANN
Commissioner of Patents and Trademarks